United States Patent
Sawayama

(10) Patent No.: US 8,989,934 B2
(45) Date of Patent: Mar. 24, 2015

(54) REGENERATION CONTROL DEVICE, HYBRID VEHICLE, REGENERATION CONTROL METHOD, AND COMPUTER PROGRAM

(75) Inventor: Akira Sawayama, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 71 days.

(21) Appl. No.: 13/819,108

(22) PCT Filed: Oct. 20, 2011

(86) PCT No.: PCT/JP2011/074122
§ 371 (c)(1),
(2), (4) Date: Feb. 26, 2013

(87) PCT Pub. No.: WO2012/096043
PCT Pub. Date: Jul. 19, 2012

(65) Prior Publication Data
US 2013/0158769 A1 Jun. 20, 2013

(30) Foreign Application Priority Data

Jan. 13, 2011 (JP) .................................. 2011-005278

(51) Int. Cl.
*B60W 20/00* (2006.01)
*B60W 10/06* (2006.01)
(Continued)

(52) U.S. Cl.
CPC .................. *B60W 20/20* (2013.01); *B60K 6/48* (2013.01); *B60L 7/18* (2013.01); *B60L 11/14* (2013.01);
(Continued)

(58) Field of Classification Search
CPC .... B60K 6/48; Y02T 10/642; Y02T 10/6221; Y02T 10/6286; B60L 11/14; B60L 15/2009; B60L 2240/12; B60L 2250/28; B60L 15/20; B60L 2210/30; B60L 2210/40; B60W 10/06; B60W 10/08; B60W 10/30; B60W 20/00; B60W 30/1886
USPC .......................... 701/22; 180/65.265; 903/902
See application file for complete search history.

(56) References Cited

U.S. PATENT DOCUMENTS

2004/0026928 A1 2/2004 Wakashiro et al.
2007/0205036 A1 9/2007 Ogata et al.

FOREIGN PATENT DOCUMENTS

CN 1527903 A 9/2004
CN 101024397 A 8/2007
(Continued)

OTHER PUBLICATIONS

The above reference was cited in the International Search Report of the corresponding International Application, PCT/JP2011/074122 dated Nov. 15, 2011, which is enclosed.

(Continued)

*Primary Examiner* — Mary Cheung
*Assistant Examiner* — Brian P Sweeney
(74) *Attorney, Agent, or Firm* — Cowan, Liebowitz & Latman, P.C.

(57) ABSTRACT

The present invention improves fuel efficiency of an engine that is the power source of an auxiliary machine. Configured is a regeneration control device that has a control means that, when a hybrid automobile is stopped, the accelerator is in a closed state, and the auxiliary machine is in an operating state, and when the indicated value for the amount of fuel injection of the engine is equal to or more than a predetermined threshold, or the indicated value exceed the threshold, causes a driving mode wherein the engine and an electric motor cooperate during deceleration after the hybrid automobile has started moving.

4 Claims, 3 Drawing Sheets

(51) Int. Cl.
  *B60W 10/08* (2006.01)
  *B60K 6/48* (2007.10)
  *B60L 7/18* (2006.01)
  *B60L 11/14* (2006.01)
  *B60L 15/20* (2006.01)
  *B60W 10/30* (2006.01)
  *B60W 30/188* (2012.01)

(52) U.S. Cl.
  CPC ......... *B60L 15/2009* (2013.01); *B60L 2240/12* (2013.01); *B60L 2250/28* (2013.01); *B60W 10/06* (2013.01); *B60W 10/08* (2013.01); *B60W 10/30* (2013.01); *B60W 20/00* (2013.01); *B60W 30/1886* (2013.01); *Y02T 10/6221* (2013.01); *Y02T 10/6286* (2013.01); *B60W 2600/00* (2013.01); *Y10S 903/93* (2013.01); *Y02T 10/7077* (2013.01); *B60L 15/20* (2013.01); *B60L 2210/30* (2013.01); *B60L 2210/40* (2013.01); *B60L 2240/421* (2013.01); *B60L 2240/423* (2013.01); *B60L 2240/443* (2013.01); *B60L 2250/16* (2013.01); *Y02T 10/7241* (2013.01); *Y02T 10/642* (2013.01); *Y10S 903/902* (2013.01)
  USPC ......... 701/22; 180/65.265; 903/902; 903/930

(56) References Cited

FOREIGN PATENT DOCUMENTS

| JP | 2000-197205 A | | 7/2000 |
|---|---|---|---|
| JP | 2008-239131 | * | 10/2008 |
| JP | 2008-239131 A | | 10/2008 |

OTHER PUBLICATIONS

Office Action of the corresponding CN 201180040643.3 application; dated Dec. 25, 2014.

* cited by examiner

REGENERATION CONTROL DEVICE, HYBRID VEHICLE, REGENERATION CONTROL METHOD, AND COMPUTER PROGRAM

CROSS REFERENCE TO RELATED APPLICATIONS

This is a U.S. national stage of application No. PCT/JP2011/074122, filed on Oct. 20, 2011. Priority under 35 U.S.C. §119(a) and 35 U.S.C. §365(b) is claimed from Japanese Patent Application No. 2011-005278, filed on Jan. 13, 2011, the disclosure of which are also incorporated herein by reference.

TECHNICAL FIELD

The present invention relates to a regeneration control device, a hybrid vehicle, a regeneration control method, and a computer program.

BACKGROUND ART

A hybrid vehicle includes an engine and an electric motor and is capable of running by the engine or the electric motor, or is capable of running by the cooperation between the engine and the electric motor. In that case, during the deceleration of the hybrid vehicle, the electric motor is rotated by the rotational inertia force of the wheel and functions as an electric generator so that the battery of the hybrid vehicle can be charged (it is referred to as regenerative power generation). As described above, when the electric motor performs regenerative power generation, regeneration torque is generated at the electric motor in proportion to the electric power regenerated by the electric motor. The regeneration torque functions as braking force during the deceleration of the hybrid vehicle (for example, see patent literature PTL1). At that time, for an efficient regenerative power generation by the electric motor, the hybrid vehicle is controlled to disconnect the engine from the electric motor in order to disconnect the engine from the driving system of the hybrid vehicle and eliminate the braking force by the engine braking so that the electric motor can perform regenerative power generation with a maximum regeneration torque (or, namely, a maximum electric power regeneration).

CITATION LIST

Patent Literature

PTL1: JP 2007-223421 A

SUMMARY OF INVENTION

Technical Problem

As described above, to increase the efficiency in the regenerative power generation by the electric motor, the regenerative power generation is sometimes performed with disconnecting the engine from the electric motor during the deceleration of a hybrid vehicle. Meanwhile, the engine disconnected from the driving system of the hybrid vehicle becomes an idling state and maintains the rotational speed at the idling. On the other hand, when the hybrid vehicle is equipped with an auxiliary machine (such as an air conditioner, a refrigerator, or the like) that is driven by the engine, the engine needs to maintain a rotational speed higher than the rotational speed at a normal idling in order to supply power necessary for the auxiliary machine even though the engine is disconnected from the driving system.

As described above, a control to disconnect the engine from the driving system of a hybrid vehicle for the regenerative power generation by the electric motor at the deceleration causes the engine to inject the fuel in order to drive an auxiliary machine. Such a control is not preferable because the fuel efficiency of the hybrid vehicle deteriorates. In other words, as for the control of a hybrid vehicle in the past, the fuel efficiency of the engine that works as a power source of such an auxiliary machine is not taken into consideration.

In light of the foregoing, an objective of the present invention is to provide a regeneration control device, a hybrid vehicle, a regeneration control method, and a computer program that can improve the fuel efficiency of the engine that works as a power source of an auxiliary machine.

Solution to Problem

An aspect of the present invention is directed to a regeneration control device. The regeneration control device of a hybrid vehicle that includes an engine and an electric motor, that is capable of running by the engine or the electric motor or capable of running by a cooperation between the engine and the electric motor, that is capable of performing regenerative power generation with the electric motor at least during deceleration, and that is equipped with an auxiliary machine that uses the engine as a power source includes control means for causing the hybrid vehicle to run by the cooperation between the engine and the electric motor during deceleration after the hybrid vehicle has started when an instructed value of an amount of fuel injection of the engine is equal to or more than a predetermined threshold, or the instructed value exceeds the threshold, while the hybrid vehicle is stationary, an accelerator is in a closed state, and the auxiliary machine is in operation.

Another aspect of the present invention is directed to a hybrid vehicle. The hybrid vehicle includes the regeneration control device according to the aspect of the present invention.

Still another aspect of the present invention is directed to a regeneration control method. The regeneration control method of a regeneration control device of a hybrid vehicle that includes an engine and an electric motor, that is capable of running by the engine or the electric motor or capable of running by a cooperation between the engine and the electric motor, that is capable of performing regenerative power generation by the electric motor at least during deceleration, and that is equipped with an auxiliary machine that uses the engine as a power source includes a step for performing a control to cause the hybrid vehicle to run by the cooperation between the engine and the electric motor during deceleration after the hybrid vehicle has started when an instructed value of an amount of fuel injection of the engine is equal to or more than a predetermined threshold, or the instructed value exceeds the threshold, while the hybrid vehicle is stationary, an accelerator is in a closed state, and the auxiliary machine is in operation.

The other aspect of the present invention is directed to a computer program. The computer program causes an information processing apparatus to implement a function of the regeneration control device according to the aspect of the present invention.

Advantageous Effects of Invention

The present invention can improve the fuel efficiency of the engine that works as a power source of an auxiliary machine.

DESCRIPTION OF EMBODIMENT

Hereinafter, the hybrid vehicle according to an embodiment of the present invention will be described with reference to FIGS. 1 to 3.

Figure 1:
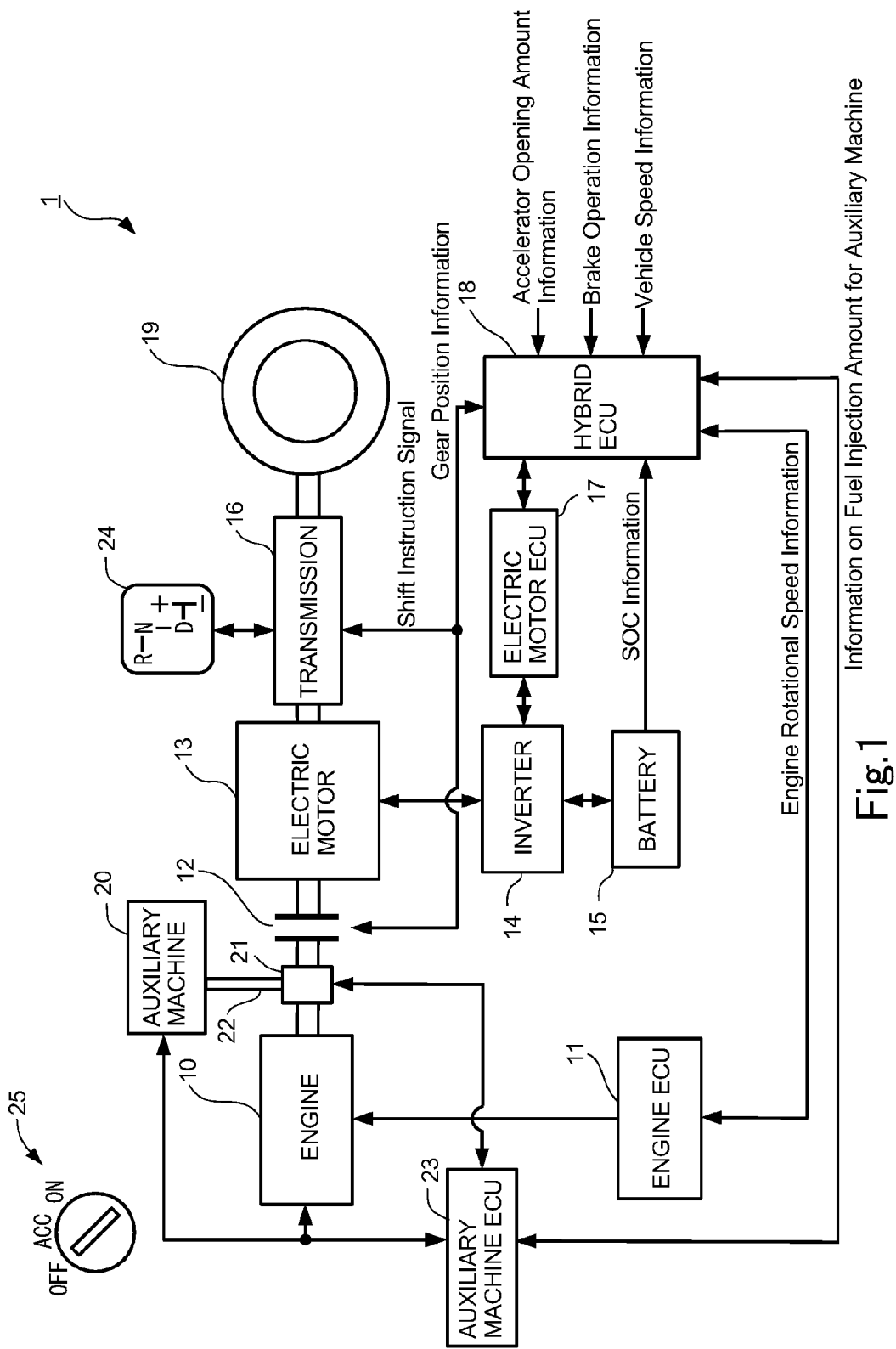
FIG. 1 is a block diagram for illustrating an exemplary structure of a hybrid vehicle according to an embodiment of the present invention.

FIG. 1 is a block diagram for illustrating an exemplary structure of a hybrid vehicle 1. The hybrid vehicle 1 is an example of a vehicle. The hybrid vehicle 1 is driven by an engine (internal combustion engine) 10 and/or an electric motor 13 through a gear box that is an automated mechanical/manual transmission. The regeneration torque of the electric motor 13 can generate braking force like the engine braking of the engine 10 at the deceleration of the vehicle. Further, the hybrid vehicle 1 is equipped with an auxiliary machine 20 that uses the engine 10 as a power source. An air conditioner, a refrigerator or the like is cited as a concrete example of the auxiliary machine 20. Note that the automated mechanical/manual transmission is a transmission that can automatically shift the gears while having the same structure as a manual transmission.

The hybrid vehicle 1 includes the engine 10, an engine Electronic Control Unit (ECU) 11, a clutch 12, the electric motor 13, an inverter 14, a battery 15, a transmission 16, an electric motor ECU 17, a hybrid ECU 18, a wheel 19, the auxiliary machine 20, an electromagnetic clutch 21, an auxiliary machine power shaft 22, an auxiliary machine ECU 23, a shift unit 24 and a key switch 25. Note that the transmission 16 includes the above-mentioned automated mechanical/manual transmission, and is operated by the shift unit 24 including a drive range (hereinafter, referred to as a D (Drive) range). When the shift unit 24 is at the D range, the gear shifting operation of the automated mechanical/manual transmission is automated.

The engine 10 is an example of an internal combustion engine, and is controlled by the engine ECU 11. The engine 10 internally combusts gasoline, light oil, Compressed Natural Gas (CNG), Liquefied Petroleum Gas (LPG), alternative fuel, or the like in order to generate power for rotating a shaft and transmit the generated power to the clutch 12.

The engine ECU 11 is a computer working in coordination with the electric motor ECU 17 according to the instructions from the hybrid ECU 18, and controls the engine 10, for example, the amount of fuel injection and the valve timing. For example, the engine ECU 11 includes a Central Processing Unit (CPU), an Application Specific Integrated Circuit (ASIC), a microprocessor (micro computer), a Digital Signal Processor (DSP), and the like, and internally has an operation unit, a memory, an Input/Output (I/O) port, and the like.

The clutch 12 is controlled by the hybrid ECU 18, and transmits the shaft output from the engine 10 to the wheel 19 through the electric motor 13 and the transmission 16. In other words, the clutch 12 mechanically connects the rotating shaft of the engine 10 to the rotating shaft of the electric motor 13 by the control of the hybrid ECU 18 in order to transmit the shaft output of the engine 10 to the electric motor 13. On the other hand, the clutch 12 cuts the mechanical connection between the rotating shaft of the engine 10 and the rotating shaft of the electric motor 13 so that the shaft of the engine 10 and the rotating shaft of the electric motor 13 can rotate at different rotational speeds from each other.

For example, the clutch 12 mechanically connects the rotating shaft of the engine 10 to the rotating shaft of the electric motor 13, for example, when the hybrid vehicle 1 runs by the power of the engine 10 and this causes the electric motor 13 to generate electric power, when the driving force of the electric motor 13 assists the engine 10, and when the electric motor 13 starts the engine 10.

Further, for example, the clutch 12 cuts the mechanical connection between the rotating shaft of the engine 10 and the rotating shaft of the electric motor 13 when the engine 10 stops or is in an idling state and the hybrid vehicle 1 runs by the driving force of the electric motor 13, and when the hybrid vehicle 1 reduces the speed or runs on the downgrade and the electric motor 13 regenerates electric power while the engine 10 stops or is in an idling state.

Note that the clutch 12 differs from the clutch operated by the driver's operation of a clutch pedal, and is operated by the control of the hybrid ECU 18.

The electric motor 13 is a so-called motor generator that supplies a shaft output to the transmission 16 by generating the power for rotating the shaft using the electric power supplied from the inverter 14, or that supplies electric power to the inverter 14 by generating the electric power using the power for rotating the shaft supplied from the transmission 16. For example, when the hybrid vehicle 1 gains the speed or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or the hybrid vehicle 1 reduces the speed or runs on the downgrade. In that case, electric power is generated by the power for rotating the shaft supplied from the transmission 16 and is supplied to the inverter 14 in order to charge the battery 15. At that time, the electric motor 13 generates the amount of regeneration torque according to the regenerated electric power.

The inverter 14 is controlled by the electric motor ECU 17, and converts the direct voltage from the battery 15 into an alternating voltage or converts the alternating voltage from the electric motor 13 into a direct voltage. When the electric motor 13 generates power, the inverter 14 converts the direct voltage from the battery 15 into an alternating voltage and supplies the electric power to the electric motor 13. When the electric motor 13 generates electric power, the inverter 14 converts the alternating voltage from the electric motor 13 into a direct voltage. In other words, in that case, the inverter 14 works as a rectifier and a voltage regulator for supplying a direct voltage to the battery 15.

The battery 15 is a secondary cell capable of being charged and discharged. The battery 15 supplies electric power to the electric motor 13 through the inverter 14 when the electric motor 13 generates power. Alternatively, the battery 15 is charged with the electric power generated by the electric motor 13 when the electric motor 13 generates electric power. A proper range of the State of Charge (hereinafter, referred to as SOC) is determined for the battery 15 and the battery 15 is controlled to maintain the SOC within the range.

The transmission 16 includes an automated mechanical/manual transmission (not shown in the drawings) that selects one of a plurality of gear ratios (change gear ratios) according to the sift instruction signal from the hybrid ECU 18 in order to shift the change gear ratios and transmit the gear-shifted power of the engine 10 and/or of the electric motor 13 to the wheel 19. Alternatively, the transmission 16 transmits the power from the wheel 19 to the electric motor 13, for example, when the vehicle reduces the speed or runs on the downgrade. Note that the automated mechanical/manual transmission can also shift the gear position to a given gear number by the driver's hand operation of the shift unit 24.

The electric motor ECU 17 is a computer working in coordination with the engine ECU 11 according to the instructions from the hybrid ECU 18, and controls the electric motor 13 by controlling the inverter 14. For example, the electric motor ECU 17 includes a CPU, an ASIC, a microprocessor (microcomputer), a DSP, and the like, and internally has an operation unit, a memory, an I/O port, and the like.

The hybrid ECU 18 is an example of a computer. For hybrid driving, the hybrid ECU 18 obtains accelerator opening amount information, brake operation information, vehicle speed information, gear position information, engine rotational speed information, and SOC information. Based on the obtained information, the hybrid ECU 18 controls the clutch 12, controls the transmission 16 by supplying the shift instruction signal, gives instruction to the electric motor ECU 17 to control the electric motor 13 and the inverter 14 and gives instruction to the engine ECU 11 to control the engine 10.

The instructions include a regeneration control instruction described below. For example, the hybrid ECU 18 includes a CPU, an ASIC, a microprocessor (microcomputer), a DSP, and the like, and internally has an operation unit, a memory, an I/O port, and the like.

Note that a computer program to be executed by the hybrid ECU 18 can be installed on the hybrid ECU 18 that is a computer in advance by being stored in a non-Volatile memory inside the hybrid ECU 18 in advance.

The engine ECU 11, the electric motor ECU 17, and the hybrid ECU 18 are connected to each other, for example, through a bus complying with the standard of the Control Area Network (CAN) or the like.

The wheel 19 is a drive wheel for transmitting the driving force to the road surface. Note that, although only a wheel 19 is illustrated in FIG. 1, the hybrid vehicle 1 actually includes a plurality of the wheels 19.

The auxiliary machine 20, for example, is an air conditioner, a refrigerator, or the like, and operates using the output of the engine 10 as its power source.

The electromagnetic clutch 21 is for transmitting the output of the engine 10 to the auxiliary machine 20 through the auxiliary machine output shaft 22. Concretely, the electromagnetic clutch 21 includes a clutch mechanism configured to connect or disconnect the output of the engine 10 and the auxiliary machine power shaft 22 according to the instructions of the auxiliary machine ECU 23. In the example of FIG. 1, after changing the direction of the output toward the direction perpendicular to the output shaft of the engine 10, the electromagnetic clutch 21 connects or disconnects the output of the engine 10 and the auxiliary machine power shaft 22 according to the instructions of the auxiliary machine ECU 23.

The auxiliary machine power shaft 22 is for connecting the electromagnetic clutch 22 to the auxiliary machine 20. The auxiliary machine power shaft 22 transmits the output of the engine 10 to the auxiliary machine 20 through the electromagnetic clutch 21.

The auxiliary machine ECU 23 is a computer device for controlling the operation of the auxiliary machine 20 by controlling the engine 10, the auxiliary machine 20, and the electromagnetic clutch 21. The auxiliary machine ECU 23 instructs the engine 10 to have the rotational speed required to drive the auxiliary machine 20 when the engine 10 is in the idling state. The auxiliary machine ECU 23 instructs the auxiliary machine 20 to perform a predetermined operation. The auxiliary machine ECU 23 instructs the electromagnetic clutch 21 to engage or disengage in order to transmit the output of the engine 10 to the auxiliary machine 20 as necessary. For example, the auxiliary machine ECU 23 includes a CPU, an ASIC, a microprocessor (microcomputer), a DSP, and the like, and internally has an operation unit, a memory, an I/O port, and the like.

As described above, the shift unit 24 is for giving the instruction from the driver to the automated mechanical/manual transmission of the transmission 16. When the shift unit 24 is at the D range, the gear shifting operation of the automated mechanical/manual transmission is automated.

The key switch 25 is a switch that is turned ON/OFF, for example, by insertion of a key by the user at the start of drive. Turning ON the switch activates each unit of the hybrid vehicle 1, and turning OFF the key switch 25 stops each unit of the hybrid vehicle 1.

Figure 2:
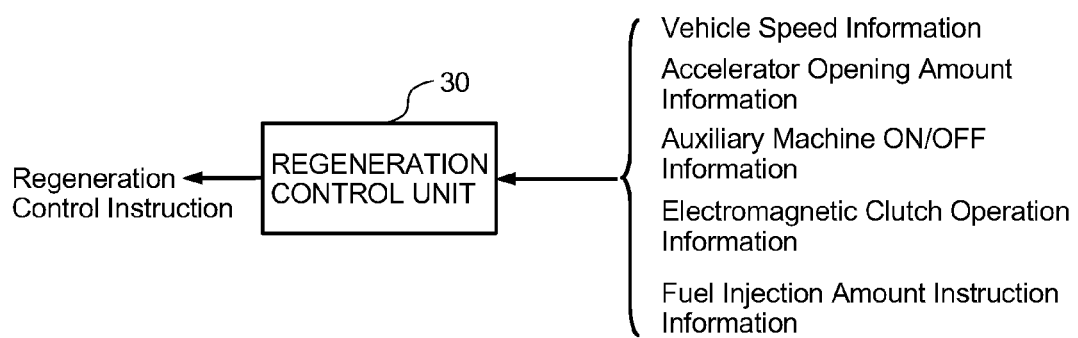
FIG. 2 is a block diagram for illustrating an exemplary configuration of a function implemented in a hybrid ECU illustrated in FIG. 1.

FIG. 2 is a block diagram for illustrating an exemplary configuration of a function implemented in the hybrid ECU 18 executing a computer program. In other words, when the hybrid ECU 18 executes a computer program, the function of the regeneration control unit 30 is implemented.

The regeneration control unit 30 is a function for giving the instruction about a regeneration control to the engine ECU 11, the clutch 12, the electric motor ECU 17, and the auxiliary machine ECU 23 based on the vehicle speed information, the accelerator opening amount information, auxiliary machine operation information, electromagnetic clutch operation information, and fuel injection amount instruction information.

Next, the process for the regeneration control performed in the hybrid ECU 18 executing the computer program will be described with reference to the flowchart illustrated in FIG. 3. Note that the procedures from step S1 to step S6 in FIG. 3 is a cycle of the process, and is repeatedly performed as long as the key switch 25 is the ON state.

Figure 3:
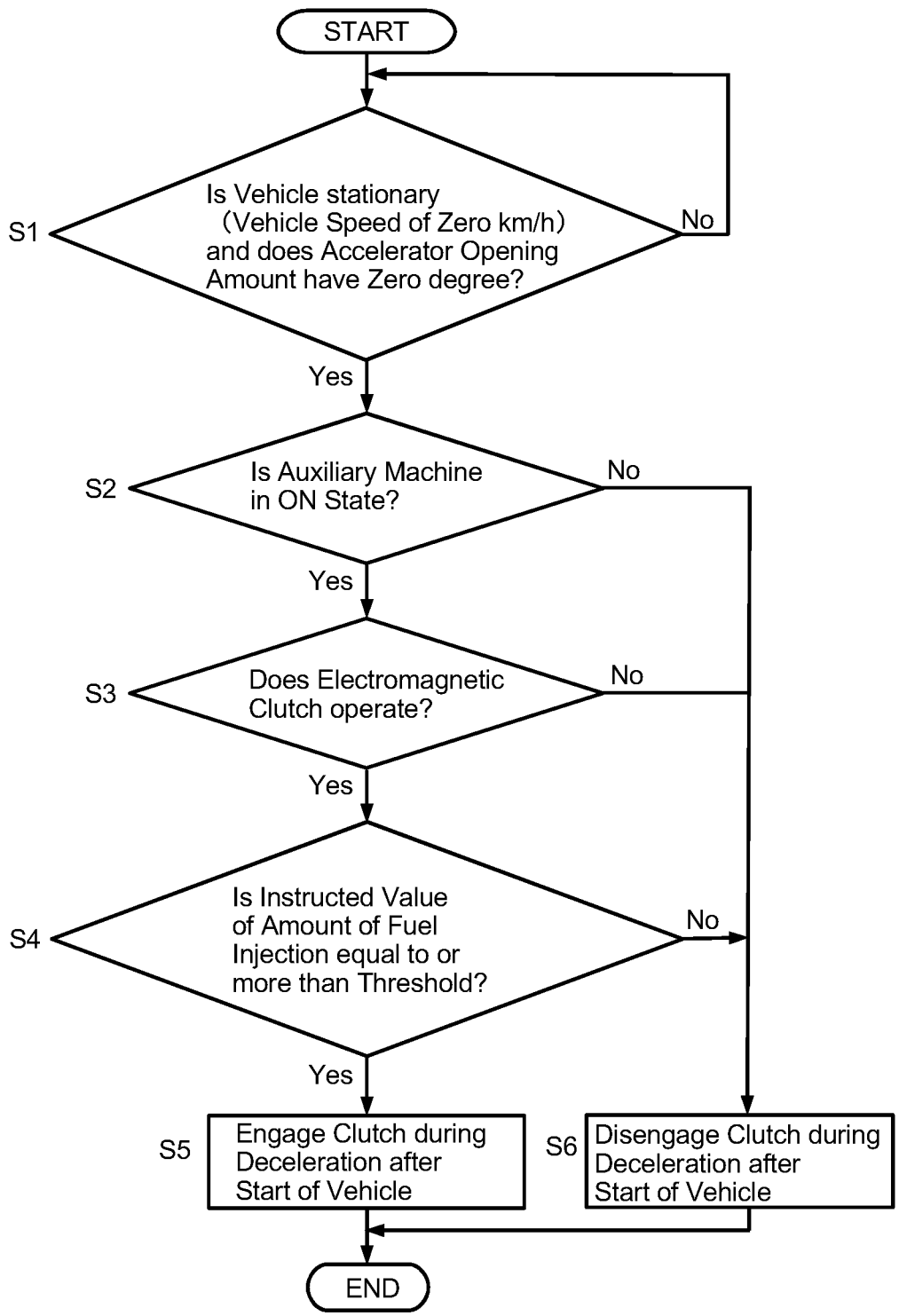
FIG. 3 is a flowchart for illustrating a process of a regeneration control unit illustrated in FIG. 2.

In the "START" illustrated in FIG. 3, the key switch 25 is the ON state, the hybrid ECU 18 has executed a computer program, and a function of the regeneration control unit 30 is implemented by the hybrid ECU 18. Then, the process goes to step S1.

In step S1, the regeneration control unit 30 determines whether the hybrid vehicle 1 remains stationary (the vehicle speed is 0 km/h) and the accelerator opening amount has zero degree. When it is determined in step S1 that the hybrid vehicle 1 remains stationary and the accelerator opening amount has zero degree, the process goes to step S2. On the other hand, when it is determined in step S1 that the hybrid vehicle 1 does not remain stationary or that the accelerator opening amount does not have zero degree even when the hybrid vehicle 1 remains stationary, step S1 of the process is repeated.

In step S2, the regeneration control unit 30 determines whether the auxiliary machine 20 is in an ON state. When it is determined in step S2 that the auxiliary machine 20 is in an ON state, the process goes to step S3. On the other hand, when it is determined in step S1 that the auxiliary machine 20 is not in an ON state (in other words, the auxiliary machine 20 is in the OFF state), the process goes to step S6.

In step S3, the regeneration control unit 30 determines whether the electromagnetic clutch 21 is being operated. When it is determined in step S3 that the electromagnetic clutch 21 is being operated, the process goes to step S4. On the other hand, when it is determined in step S3 that the electromagnetic clutch 21 is not being operated, the process goes to step S6.

In step S4, the regeneration control unit 30 determines whether the instructed value of the amount of fuel injection is equal to or more than a threshold. When it is determined in step S4 that the instructed value of the amount of fuel injection is equal to or more than the threshold, the process goes to step S5. On the other hand, when it is determined in step S4 that the instructed value of the amount of fuel injection is less than the threshold, the process goes to step S6.

In step S5, when the hybrid vehicle 1 decelerates after starting, the regeneration control unit 30 engages the clutch 12 and terminates a cycle of the process (END).

In step S6, when the hybrid vehicle 1 decelerates after starting, the regeneration control unit 30 disengages the clutch 12 and terminates a cycle of the process (END).

ADVANTAGEOUS EFFECT

As described above, when the instructed value of the amount of fuel injection of the engine 10 is equal to or more than the threshold (S4) while the hybrid vehicle 1 remains stationary (in other words, the vehicle speed is 0 km/h) and the engine 10 is in an idling state (in other words, the accelerator opening amount has zero degree) (Yes in S1), the auxiliary machine 20 is in an ON state (Yes in S2), and the electromagnetic clutch 21 is being operated (Yes in S3), the regeneration control unit 30 engages the clutch 12 when the stationary hybrid vehicle 1 decelerates after starting (S5).

Note that, when the hybrid vehicle 1 runs, the instructed value of the amount of fuel injection of the engine 10 only for driving the auxiliary machine 20 cannot be found because the power of the engine 10 is also used for purpose other than for driving the auxiliary machine 20. Thus, the instructed value of the amount of fuel injection of the engine 10 when the hybrid vehicle 1 remains stationary, the engine 10 is in an idling state, the auxiliary machine 20 is in an ON state, and the electromagnetic clutch 21 is being operated comes into focus.

In other words, the amount of fuel injection when the hybrid vehicle 1 remains stationary and is in an idling state, and the auxiliary machine 20 is OFF state is a known value that can be found in advance. Thus, subtracting the known value from the amount of fuel injection when the hybrid vehicle 1 remains stationary and is in an idling state, and the auxiliary machine 20 is in the ON state can calculate, with high accuracy, the amount of fuel injection for driving the auxiliary machine 20.

Further, the state in which the electromagnetic clutch 21 does not operate (No in S3) although the auxiliary machine 20 is in the ON state (Yes in S2) is a state, for example, in which the auxiliary machine 20 is a refrigerator, and the operation of the refrigerator is stopped although the switch of the refrigerator is in the ON state because the temperature inside the refrigerator is equal to or less than a predetermined temperature and its thermostat works.

When the clutch 12 is engaged while the hybrid vehicle 1 decelerates, the rotational inertia force of the wheel 19 is transmitted to the engine 10. This enables the engine 10 to secure the rotational speed equal to or more than a predetermined rotational speed required to activate the auxiliary machine 20 without performing fuel injection when the hybrid vehicle 1 activates the auxiliary machine 20. This saves the fuel consumption for activating the auxiliary machine 20. The fuel efficiency can be improved.

A normal regenerative power generation is performed while the clutch 12 is kept disengaged when the auxiliary machine 20 is not in the ON state (or, namely, is in the OFF state), when the electromagnetic clutch 21 is not being operated, or when the instructed value of the amount of fuel injection of the engine 10 is equal to or less than the threshold while the hybrid vehicle 1 remains stationary and the accelerator is closed although the electromagnetic clutch 21 is being operated. Note that disengaging the clutch 12 enables the electric motor 13 to regenerate more electricity. Thus, it is normally preferable that the clutch 12 is kept disengaged, for example, when the SOC of the battery 15 is low. However, to save the fuel consumption in order to activate the auxiliary machine 20, it is preferable to preferentially perform the control of the flowchart illustrated in FIG. 3 even though the regenerative power generation is reduced because the fuel consumption is increased in order to activate the auxiliary machine 20 when the auxiliary machine 20 is activated.

OTHER EMBODIMENTS

In the flowchart illustrated in FIG. 3, determining in step S2 whether "the auxiliary machine is in an ON state" can be omitted. As described above, for example, when the auxiliary machine 20 is a refrigerator, the auxiliary machine 20 sometimes stops because the thermostat works even though the auxiliary machine 20 is in an ON state. At that time, the electromagnetic clutch 21 that transmits the power to the auxiliary machine 20 also is not operated. In other words, determining whether the auxiliary machine 20 is in operation can depend not on determining whether the auxiliary machine 20 is in the ON state but on determining whether the electromagnetic clutch 21 is being operated. In such a case, the determination in step S2 is unnecessary and can be omitted.

On the other hand, when the auxiliary machine 20 is a machine such as a concrete mixer that necessarily causes the electromagnetic clutch 21 to operate while the auxiliary machine 20 is in the ON state, whether the auxiliary machine 20 is in operation can be determined by determining whether the auxiliary machine 20 is in the ON state or by determining whether the electromagnetic clutch 21 is being operated. In such a case, only one of the determinations in step S2 and step S3 has to be performed and one of step S2 and step S3 can be omitted.

The values of the boundaries for determination can variously be changed, for example, the "equal to or more than" can be changed into "exceeds" and the "less than" can be changed into "equal to or less than" in the description of the flowchart illustrated in FIG. 3.

Although the engine 10 has been described as an internal combustion engine, the engine 10 can also be a heat engine including an external combustion engine.

Further, while the computer program executed by the hybrid ECU 18 is installed on the hybrid ECU 18 in advance in the above-mentioned description, the computer program can be installed on the hybrid ECU 18 as a computer by attaching removable media recording the computer program (storing the computer program), for example, to a drive (not shown in the drawings) and storing the computer program read from the removable media in a non-volatile memory inside the hybrid ECU 18, or receiving, with a communication unit (not shown in the drawings), a computer program transmitted through a wired or wireless transmission medium and storing the computer program in a non-volatile memory inside the hybrid ECU 18.

Further, each ECU can be implemented by an ECU combining each of the ECUs. Alternatively, an ECU can newly be provided by the further subdivision of the function of each ECU.

Note that the computer program executed by the computer can be for performing the process in chronological order according to the order described herein or can be for performing the process in parallel or at the necessary timing, for example, when the computer program is invoked.

Further, the embodiments of the present invention are not limited to the above-mentioned embodiments, and can be variously modified without departing from the gist of the invention.

The invention claimed is:

1. A regeneration control device of a hybrid vehicle that includes an engine and an electric motor, that is capable of running by the engine or the electric motor or capable of running by a cooperation between the engine and the electric motor, that is capable of performing regenerative power generation with the electric motor at least during deceleration, and that is equipped with an auxiliary machine that uses the engine as a power source, the regeneration control device comprising:
    a hybrid electronic control unit for controlling the operation of the engine and electric motor and configured to perform functions of a contra unit and a controller,
    the control unit for deciding whether an instructed value of an amount of fuel injection of the engine is equal to or more than a predetermined threshold while the hybrid vehicle is stationary, an accelerator is in a closed state, and the auxiliary machine is in operation; and
    the controller for controlling the operation of the engine and the motor to cause the hybrid vehicle to run by the cooperation between the engine and the electric motor during deceleration after the instructed value has been decided as being equal to or more than the predetermined threshold and then the hybrid vehicle has started.

2. A regeneration control method of a regeneration control device of a hybrid vehicle that includes an engine, an electric motor, and a hybrid electronic control unit for controlling the operation of the engine and electric, that is capable of running by the engine or the electric motor or capable of running by a cooperation between the engine and the electric motor, that is capable of performing regenerative power generation by the electric motor at least during deceleration, and that is equipped with an auxiliary machine that uses the engine as a power source, the regeneration control method comprising:
    deciding, by the hybrid electronic control unit, whether an instructed value of an amount of fuel injection of the engine is equal to or more than a predetermined threshold while the hybrid vehicle is stationary an accelerator is in a closed state and the auxiliary machine is in operation; and
    controlling, by the hybrid electronic control unit, the operation of the engine and the motor to cause the hybrid vehicle to run by the cooperation between the engine and the electric motor during deceleration after the instructed value has bee decided as being equal to or more than the predetermined threshold and then the hybrid vehicle has started.

3. A hybrid vehicle comprising an engine, an electric motor, an auxiliary machine that uses the engine as a power source, and a regeneration control device for controlling regenerative power generation of the electric motor, that is capable of running by the engine or the electric motor or capable of running by a cooperation between the engine and the electric motor, in which:
    the regeneration control device comprises a hybrid electronic control unit for controlling the operation of the engine and electric motor, wherein the hybrid electronic control unit includes a control unit and a controller:
    the control unit for deciding whether an instructed value of an amount of fuel injection of the engine is equal to or more than a predetermined threshold while the hybrid vehicle is stationary, an accelerator is in a closed state, and the auxiliary machine is in operation; and
    the controller for controlling the operation of the engine and the motor to cause the hybrid vehicle to run by the cooperation between the engine and the electric motor during deceleration after the instructed value had been decided as being equal to or more than the predetermined threshold and then the hybrid vehicle has started.

4. A non-transitory computer-readable storage medium storing a computer program which causes a computer to perform a regeneration control method of a regeneration control device of a hybrid vehicle that includes an engine and an electric motor, that is capable of running by the engine or the electric motor or capable of running by a cooperation between the engine and the electric motor, that is capable of performing regenerative power generation by the electric motor at least during deceleration, and that is equipped with an auxiliary machine that uses the engine as a power source, the regeneration control method comprising steps of:
    deciding, by the regeneration control device, whether an instructed value of an amount of fuel injection of the engine is equal to or more than a predetermined threshold while the hybrid vehicle is stationary, an accelerator is in a closed state, and the auxiliary machine is in operation; and
    controlling, by the regeneration control device, the operation of the engine and the motor to cause the hybrid vehicle to run by the cooperation between the engine and the electric motor during deceleration after the instructed value has been decided as being equal to or more than the predetermined threshold and then the hybrid vehicle has started.

* * * * *